(12) United States Patent
Yildirim

(10) Patent No.: US 12,284,987 B2
(45) Date of Patent: Apr. 29, 2025

(54) MULTIPURPOSE SEPARATOR USED TO PROVIDE BEE ENTRANCE TO AND EXIT FROM A BEEHIVE AND COLONY MANAGEMENT

(71) Applicant: YILDIRIM PLASTİK MAKİNE VE KALIP İMALAT İNŞAAT TURİZM SANAYİ VE TİCARET LİMİTED SIRKETI, Istanbul (TR)

(72) Inventor: Muzaffer Yildirim, Istanbul (TR)

(73) Assignee: YILDIRIM PLASTIK MAKINE VE KALIP IMALAT INSAAT TURIZM SANAYI VE TICARET LIMITED SIRKETI, Istanbul (TR)

( * ) Notice: Subject to any disclaimer, the term of this patent is extended or adjusted under 35 U.S.C. 154(b) by 0 days.

(21) Appl. No.: 18/270,554

(22) PCT Filed: Dec. 30, 2021

(86) PCT No.: PCT/TR2021/051644
§ 371 (c)(1),
(2) Date: Jun. 30, 2023

(87) PCT Pub. No.: WO2022/146401
PCT Pub. Date: Jul. 7, 2022

(65) Prior Publication Data
US 2024/0065235 A1    Feb. 29, 2024

(30) Foreign Application Priority Data

Dec. 31, 2020   (TR) .................................. 2020/22734

(51) Int. Cl.
*A01K 47/06* (2006.01)

(52) U.S. Cl.
CPC .................................. *A01K 47/06* (2013.01)

(58) Field of Classification Search
USPC .............................. 449/20, 21, 23, 24, 25, 46
See application file for complete search history.

(56) References Cited

U.S. PATENT DOCUMENTS

| 3,108,294 | A | * | 10/1963 | Brown, Jr. | ............. | A01K 47/06 43/65 |
| 4,094,026 | A | * | 6/1978 | Simoni | .................. | A01K 47/00 449/21 |

(Continued)

FOREIGN PATENT DOCUMENTS

| KR | 20190001048 U | * | 5/2019 | |
| WO | WO-2012011881 A2 | * | 1/2012 | ............. A01K 47/00 |

OTHER PUBLICATIONS

International Search Report mailed Jun. 27, 2022, in PCT/TR2021/051644.

(Continued)

*Primary Examiner* — Joshua J Michener
*Assistant Examiner* — Nicole Paige Maccrate
(74) *Attorney, Agent, or Firm* — Bayramoglu Law Offices LLC

(57) ABSTRACT

The invention relates to separators (1) that regulate bees' entrance to and exit from a hive according to various seasonal and usage requirements, that are provided with several bee entrance-exit holes (6) that allow a bee colony to enter to and exit from a hive, and that are provided with at least one primary cover (3) and a secondary cover (4) associated with the primary cover (3) in order to close at least a portion of said holes (6).

21 Claims, 5 Drawing Sheets

(56) References Cited

U.S. PATENT DOCUMENTS

| | | | | |
|---|---|---|---|---|
| 5,348,511 A | * | 9/1994 | Gross ..................... | A01K 47/06 449/20 |
| 8,764,512 B1 | * | 7/2014 | Watson .................. | A01K 53/00 449/20 |

OTHER PUBLICATIONS

Written Opinion of the International Searching Authority mailed Jun. 27, 2022, in PCT/TR2021/051644.

* cited by examiner

MULTIPURPOSE SEPARATOR USED TO PROVIDE BEE ENTRANCE TO AND EXIT FROM A BEEHIVE AND COLONY MANAGEMENT

TECHNICAL FIELD

The present invention relates to an entrance-exit separator that is used for managing bees' entrance to and exit from beehives. Since it is adjustable according to different seasonal and usage requirements, the bee entrance-exit of the invention enables managing bees' entrance to and exit from a hive according to according to different seasonal and usage requirements.

STATE OF THE ART

Beekeeping is a type of husbandry that is widely practiced across the globe and that invariably holds a prominent place in agricultural studies. Beekeeping may yield particularly favorable and efficient results in environments that offer suitable climate and vegetation conditions.

Ever-developing technology and modes of application pave the way for the replacement of beekeeping activities carried out by using simple and rudimentary hives and beekeeping materials, with modern beekeeping practices.

Modern beekeeping practices aim to increase honey yield per colony, while enabling effective collection of apiculture products other than honey (pollen, propolis, royal jelly, etc.), which become increasingly more valuable today.

The use of modern beekeeping equipment, on the other hand, offers significant advantages in combatting against diseases and pests (varroa, etc.) of bees, which pose a substantial handicap for beekeeping.

Modern beekeeping equipment may further eliminate the risk imposed on food safety due to the fact that rudimentary hives in use in the state of the art are prone to rusting, mold growth, etc., and that honey, and apiculture products other than honey may come into contact with such elements.

For instance, simple wooden hives used in the state of the art are being abandoned gradually and replaced by hives manufactured partially or entirely from polymer.

The utility model application numbered TR 2010/04531 may serve as an example for applications of hives partially manufactured from polymer. The patent application numbered TR 2007/04518 may be given as an example to hives that are entirely made of polymer. Such hive mechanisms produced from food grade polymer may provide significant advantages for beekeeping.

Such hives manufactured from polymer prevent apiculture products like honey, etc. from coming into contact with materials that pose food safety hazards.

The most important characteristic of such hive mechanisms is the fact that they can include various built-in apparatuses for allowing beekeepers to ventilate the hive, to combat pests and diseases, and to manage and operate the bee colony.

One of the most important of such functional structures is the bee entrance-exit separators that allow for managing a bee colony according to various use and seasonal requirements.

The utility model application numbered TR 2010/04531 available discloses the details of a bee entrance-exit separator. The separator disclosed in said application enables regulating the movements of a bee colony as well as the entry-exit parameters of a hive by means of components like holes, slider, etc., integrated into the separator.

The slider mechanism disclosed in the utility model application numbered TR 2010/04531 is located at both ends of the separator and fails to satisfy in terms of different entrance-exit options when moved to different positions.

For instance, when the slider is moved towards the midpoint of the separator, entrance-exit holes located in this region can only be partially closed.

Analogously, side entrance-exit holes can only be partially closed, when the slider is moved towards the edges of the separator.

The ability to change the position of the separator in this manner intends to regulate a bee colony's entrance to and exit from the hive under different circumstances.

However, the slider mechanism disclosed in the utility model application numbered TR 2010/04531 describes an embodiment that either does not close or partially closes the bee entrance-exit holes located at the midsection of the separator.

Therefore, the relevant separator underperforms during the application.

Since the middle section of known hives generally contain a pollen trap, the holes located at the center of the separator are left open during the pollen collecting season with the intention to guide the bees to the pollen trap as bees pass through these holes.

However, in cases where pollen is not desired to be taken from the bees, holes located at the center may be closed and bees may be desired to enter the hive through the holes located on the sides of the separator. Structures comprising a slider mechanism with limitations as the slider mechanism disclosed in the utility model application numbered TR 2010/04531 do not enable closing the center portion entirely or almost entirely.

Analogously, the holes on the pollen trap or even all the holes of the hive may be desired to stay closed particularly during the relocation of the hive or when the environment outside the hive is cold. Under such circumstances, the slider mechanism disclosed in the utility model application numbered TR 2010/04531 will be inadequate, and it will be necessary to remove and invert the separator in order to close it. This is not a preferred embodiment since such a process is not easy for a beekeeper to perform.

In fact, as the beehives are not used only for producing honey nowadays and stationary beekeeping is currently replaced with itinerant beekeeping due to itinerant beekeeping being more efficient, active use of separators becomes increasingly important.

It is important to be able to close partially or completely bee entrance-exit easily without employing further apparatuses in addition to separators. Thus, a beekeeper can swiftly gather the bees that are being accommodated in one region and relocate them to another region. This would pose significance for itinerant beekeepers.

Since separators alone used in the state of the art are inadequate in this sense, the hives are tried to be partially or completely closed by plugging gaps on the separator with fabrics.

Since honey is not the sole product obtained from hives, hives are required to be manipulable so that such products, which usually have high economic value, may be collected.

Therefore, separators are important in this regard as well even for modernized hive mechanisms. Different positions of sliders or covers that belong to separators would prevent bees from passing through certain holes located on the separator, and it will be possible to steer bees to other holes of a separator that permit entrance. Pollen collection is the most important example that may be given to apiculture products other than honey.

Closure of holes that are located on separators available in the state of the art and that are connected to pollen traps is usually carried out by using rudimentary means. These holes are generally plugged by using fabrics or other external closing elements.

Another disadvantage of slider mechanisms used in the state of the art is the problem of fixing a slider at a given position. In cases where a slider is not secured properly, it may undesirably cause a closed section to move to an open position or open section to move to a closed position.

Problems Aimed to be Solved by the Invention

The object of the invention is to provide a bee entrance-exit separator designed so as to enable managing bees' entrance to and exit from a hive according to different usage and seasonal requirements by means of providing said entrance-exit separator with a cover mechanism that may be adjusted according to various usage and seasonal requirements.

Thus, bee passing holes located on the separator may be opened or closed completely or partially by means of the cover available on the separator without using an external closure piece.

To that end, at least one primary cover is created such that it moves on a movement path on the separator. The primary cover has the structure and dimensions so as to cover only a certain portion of the holes located on the separator.

The primary cover is associated with a secondary cover that may be opened and closed over the primary cover. When the secondary cover is opened over the primary cover, the secondary cover can close the holes on the separator that cannot be closed by the primary cover.

In the preferred embodiment of the present invention, moving the secondary cover underneath the primary cover by means of a slider mechanism renders it possible to partially or completely close the holes that are intended to be closed by the secondary cover.

The separator comprises at least one fixing element so that the primary and/or secondary cover may be fixed during the movements thereof, the covers can be fixed by means of these.

The use of the separator that provides a practical means for opening a hive of the invention enables opening the hive both easily and practically. The capability of opening and closing a hive quickly and practically will provide significant advantages for itinerant beekeeping activities.

DESCRIPTION OF THE REFERENCES IN THE FIGURES

Figure 1:
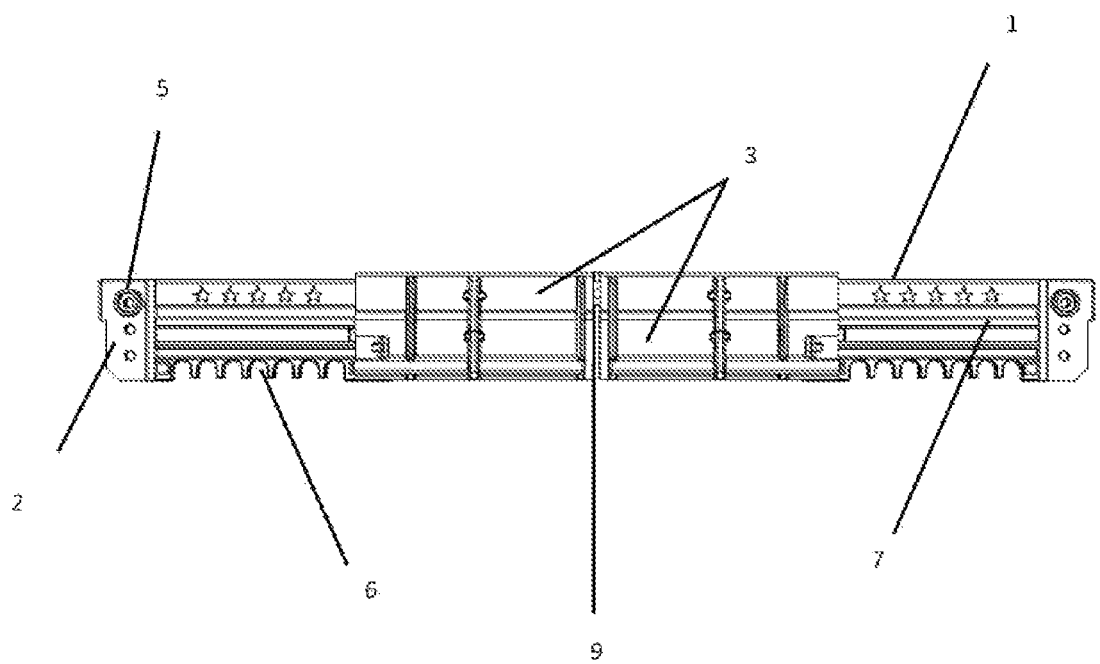
FIG. 1. The front view of the functional bee entrance-exit separator in nectar collection position, FIG. 2. The front view of the functional bee entrance-exit separator in a narrowed nectar collection position, FIG. 3. The front view of the functional bee entrance-exit separator in the position closed to nectar collection, FIG. 4. The front view of the functional bee entrance-exit separator in a narrowed pollen collection position, FIG. 5. The front view of the functional bee entrance-exit separator in a pollen collection position, FIG. 6. The front view of a further embodiment of the functional bee entrance-exit separator in pollen collection position, FIG. 7. The top perspective view of a further embodiment of the functional bee entrance-exit separator in pollen collection position, FIG. 8. The front view of a further embodiment of the functional bee entrance-exit separator in a narrowed pollen collection position, FIG. 9. The front view of a further embodiment of the functional bee entrance-exit separator in a partially narrowed pollen collection position, FIG. 10. The front view of the separator body in a disassembled state in a further embodiment of the functional bee entrance-exit separator, FIG. 11. The front view of the separator, FIG. 12. The detailed front view of the locking protrusion and hole thereof, FIG. 13. The view of the separator that is located in the framework and that is provided with an alighting-board.

1. Separator
2. Base mounting element
3. Primary cover
3.1. Primary handle
3.2. Handle movement gap
3.3. Handle movement opening
4. Secondary cover
4.1. Secondary handle
4.2. Guide
5. Hive mounting element
6. Bee entrance-exit hole
7. Movement path
8. Fixing element
9. Separation element
10. Auxiliary bee exit hole
11. Locking protrusion
12. Locking hole
13. Framework
14. Alighting-board
15. Drone hole

DESCRIPTION OF THE INVENTION

The present invention relates to separators (1) that regulate bees' entrance to and exit from the hive according to various usage and seasonal requirements; that are provided with several bee entrance-exit holes (6) that allow a bee colony to enter to and exit from a hive; and that are further provided with at least one primary cover (3) position of which may be changed on a movement path (7) so that at least a portion of said holes (6) may be closed.

In the most fundamental state of the present invention, bee entrance-exit holes (6) located on the separator (1) may be closed without using any external closure piece and by means of at least one secondary cover (4) that is associated in a manner in which it may be opened and closed over a primary cover (3).

According to this embodiment, the primary cover (3) that moves on a movement path (7) on the separator has a structure and dimensions so as to close only a certain portion of the holes located on the separator (1).

When the secondary cover (4) is opened over the primary cover (3), the secondary cover can partially or completely close the holes (6) on the separator (1) that cannot be closed by means of the primary cover (3).

According to the preferred embodiment of the present invention, the secondary cover (4) and the primary cover (3) may be operated over each other and over the separator in a sliding manner. In the preferred embodiment of the present invention, the separator (1) is operated by means of 2 primary covers (3), which may be operated reciprocally on the separator, and 2 secondary covers (4), which may be stowed and deployed therein.

FIG. 1 illustrates the position of the separator that allows the bee colony to collect nectar. In this position, the primary covers (3) close the bee entrance-exit holes (6) that are located at the center and associated with a pollen trap. The secondary cover (4) is closed over the primary cover (3) in this position. Thus, the holes (6) that are not associated with the pollen trap located on the side portions of the separator are in an open state.

Bees that enter through the holes (6) located in this portion are enabled to collect nectar as they do not come across the pollen trap.

Figure 2:
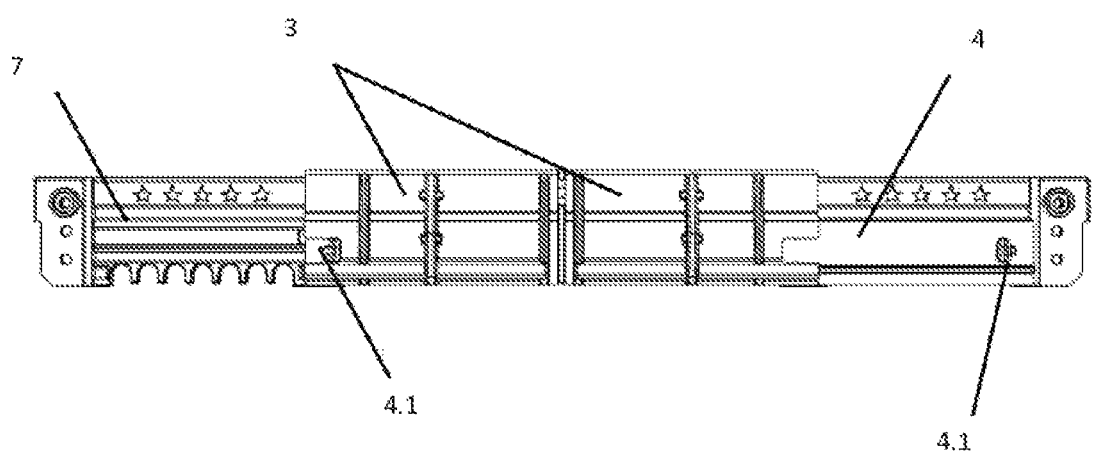

In order to limit nectar collection, the secondary cover (4) that operates in connection with one of the primary covers (3) is open while the other secondary cover (4) is closed over the primary cover (3), i.e., is operated in a closed state (FIG. 2). In this case, only one of the holes (6), which is not associated with the pollen trap located on the side portions of the separator (1) is in an open state.

Figure 3:
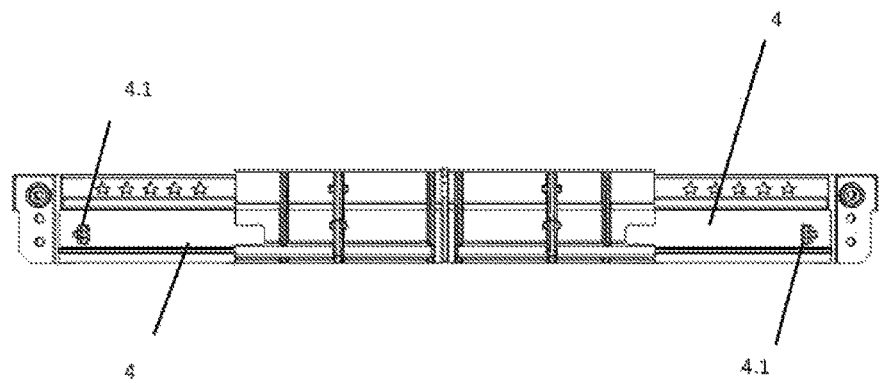

In FIG. 3, all holes (6) that are opened over the primary cover (3) and are not associated with the pollen trap located on the side portions of the separator (1) are in a closed state in the secondary cover (4). In this case, the hive is completely closed to the entrance and exit of bees. Such uses may be preferred by the user in cases where weather is cold, or the hive needs to be relocated.

Figure 4:
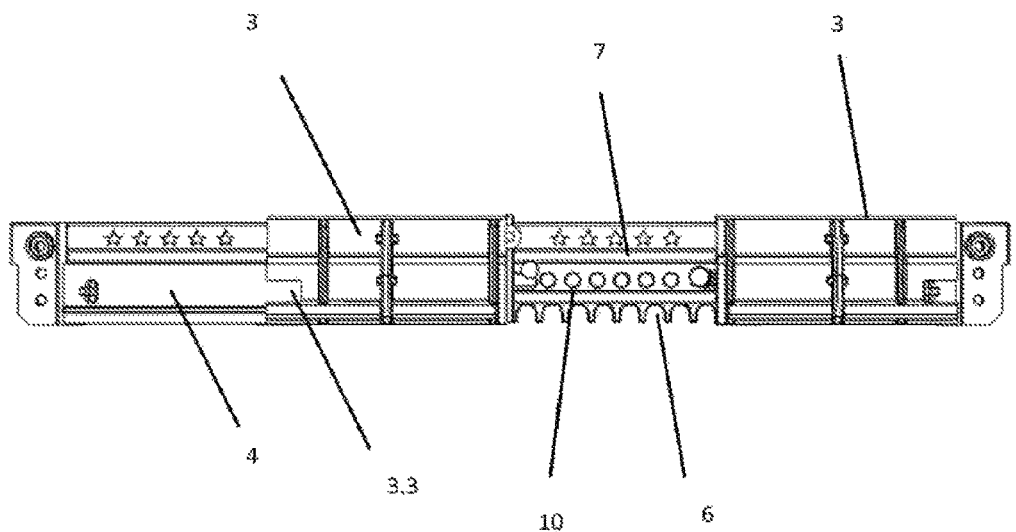

FIG. 4 illustrates the narrowed pollen collection position of the separator (1). In this position, one of the secondary covers (4) is in a state in which it is opened over the primary cover (3). The other primary cover (3) and the secondary cover (4) are in an overlapped state. In this use, however, overlapped primary cover (3) and secondary cover (4) are stowed on the side portion of the separator (1). Thus, the holes (6) that are not associated with the pollen trap located on the side portion of the separator (1) are closed and holes (6) associated with the pollen trap at the center are open.

In the pollen collection position, the corresponding portion of which is closed as illustrated in FIG. 4, only one primary cover (3) side is left open among the holes (6) associated with the pollen trap located at the center.

Figure 9:
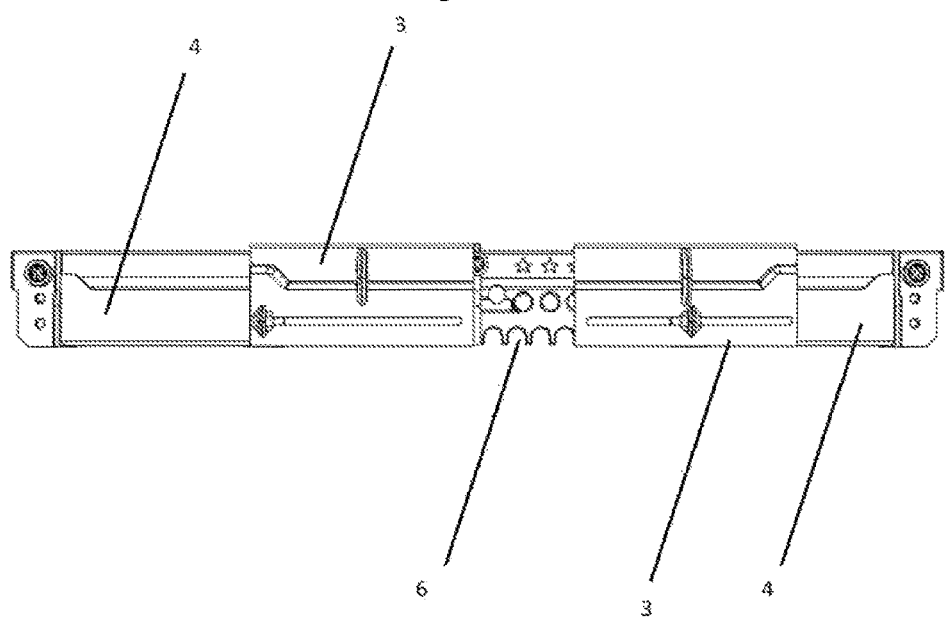

When the user desires to employ the pollen collection position, the corresponding portion of which is closed as illustrated in FIG. 4, by making the position narrower, the user can use a portion of the holes (6), which are in an open state as illustrated in FIG. 9 and associated with the pollen trap located at the center, by partially opening the secondary cover (4).

Figure 5:
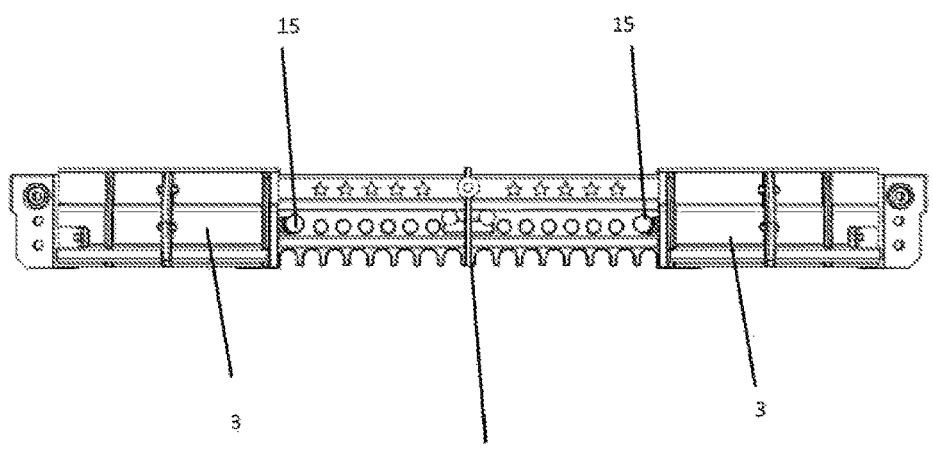

In FIG. 5, all holes (6) that are associated with the pollen trap located on the side of both primary cover (3) are in an open state. This position serves as an example for the full pollen collection position.

The separator (1) according to FIGS. 1 and 5 is provided with two primary covers (3) that are separated by means of at least one separation element (9). Each primary cover (3) moves on separately formed movement paths (7) on the plane of the separator (1).

Each primary cover (3) is also individually associated with a secondary cover (4). According to the preferred embodiment of the present invention, the secondary cover (4) moves into and out of the primary cover (3) by means of a spring action.

Outward movement moves the secondary cover (4) out of the body of the primary cover (3) and enables increasing the total area closed by both covers (3, 4). Inward movement, on the other hand, moves the secondary cover (4) to the inside of the body of the primary cover, thereby decreasing the total area closed by both covers (3, 4). The secondary cover (4) moves to a state in which it is covered by the primary cover (3) at the end of the inward movement.

According to the preferred embodiment of the present invention, the secondary cover (4) and the primary cover (3) move on movement paths (7) that are in the form of a slider. According to the preferred embodiment of the present invention, said movement paths (7) are in the form of a rail.

When the user desires to move the primary cover (3) on movement paths (7), the user can move the primary cover (3) by holding a primary handle (3.1). The primary handle (3.1) may be in the form of a protrusion created on the primary cover (3).

Analogously, the movement of the secondary cover (4) can be performed by means of a secondary handle (4.1) created in the form of a similar protrusion.

Figure 6:
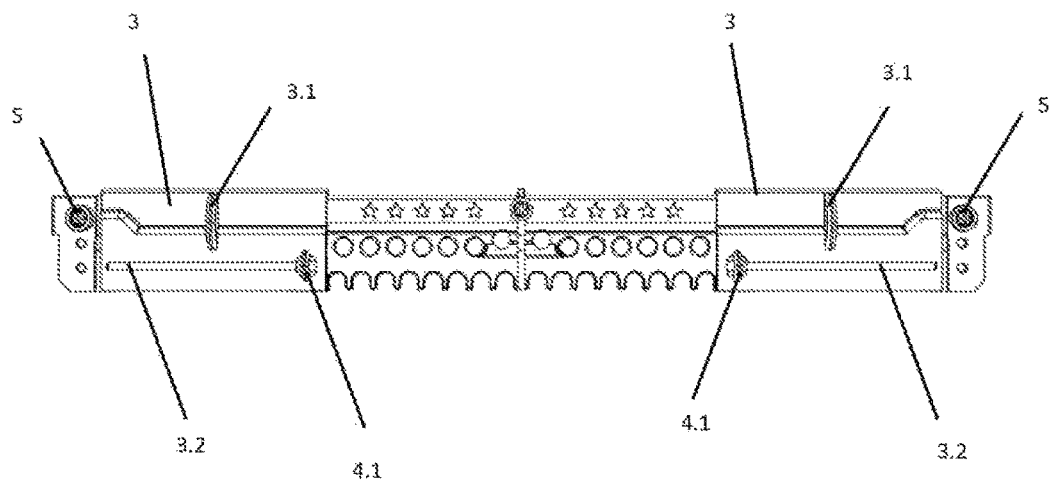
Figure 7:
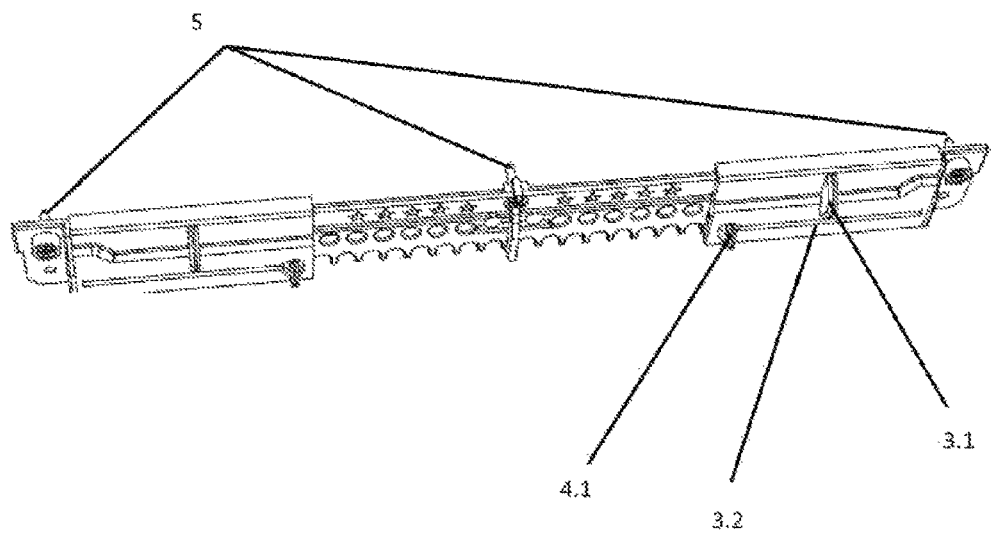
Figure 8:
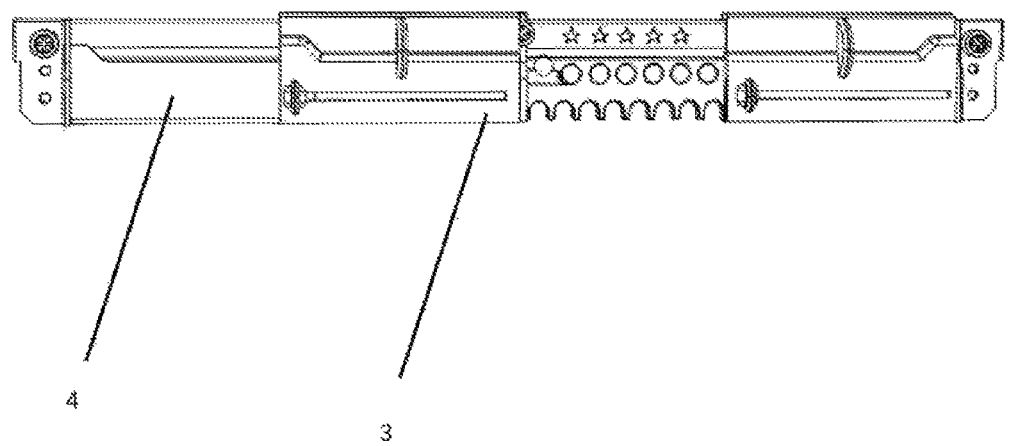

According to the preferred embodiment of the present invention, since the secondary cover (4) is closed by means of being moved underneath the primary cover (3), the primary cover (3) is provided with a handle movement gap (3.2), which is a gap in which the secondary handle (4.1) can operate (FIG. 6). This configuration enables the secondary cover (4) to move both right and left underneath the primary cover (3).

In FIG. 4, which illustrates another embodiment of the present invention, the secondary handle (4.1) functions inside a handle movement opening (3.3) located on the primary cover (3). According to FIG. 4, the handle movement opening (3.3) is in the form of an aperture.

The hive can be operated in two sections since it is provided with two primary covers (3) that are separately positioned on both sides of a separation element (9) located at the midsection of the separator (1), and the secondary cover (4) which operates in connection with said covers (3).

In such a case, the hive can be divided into two sections by means of a division board that aligns the separation element (9) and two different bee colonies can be accommodated in said two separate sections.

Two different bee colonies can be controlled independently by means of the primary covers (3) created independently from one another on both sides of the separation element (9), and secondary covers (4) that are operated in connection therewith.

According to one of the preferred embodiments of the present invention, the separator (1) is attached to the hive, or to the base of the hive by means of a base mounting element (2) created on at least one side portion of the separator (1). This portion may be attached or detached by means of a close fit created in the hive or on the base of the hive.

Moreover, other mounting members available in the state of the art such as screws, etc., can be used in cases where the separator (1) is desired to be fixed to the wall of the hive. These may be operated by means of the hive mounting elements (5) created on the separator (1).

The separator (1) is further provided with fixing elements (8) so that the secondary cover (4) and/or the primary cover (3) can be fixed at desired positions on the separator (1).

Figure 10:
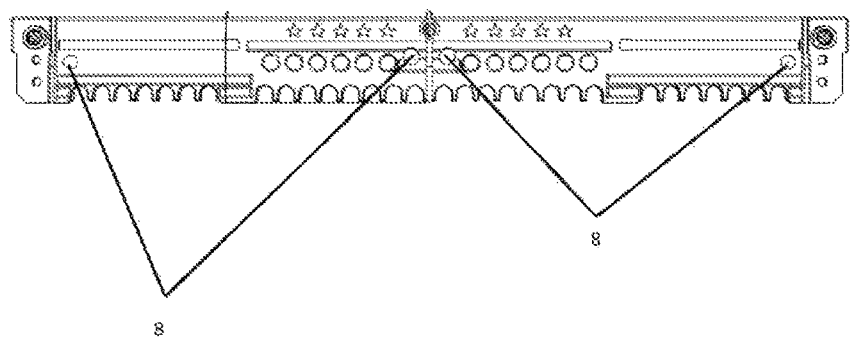

According to FIG. 10, 4 fixing elements (8), one for each side of the separator (1), and one adjacent to the separation element (9), are provided in total. This use intends to fix the covers (3, 4) in said positions.

According to the preferred embodiment of the present invention, said fixing elements (8) are in the form of circular protrusions, and the fixing elements (8) can be seated in and removed from tolerance gaps by means of relatively small forces applied by the user, since similar tolerance gaps are also created on the contact surfaces of covers (3, 4). These elements fix the covers (3, 4) during the relocation and the use of the hive.

The separator (1) according to FIG. 4, which illustrates one of the embodiments of the present invention, is further provided with auxiliary bee exit holes (10) in addition to the bee entrance-exit holes (6).

The auxiliary bee exit holes (10) facilitate the exit of bees from the hive, which enter the hive through the bee entrance-exit holes (6), when the separator (1) is in pollen collection position. Thus, the traffic in the hive can be relieved.

According to the preferred embodiment of the present invention, the auxiliary bee exit holes (10) are located above the holes (6) associated with the pollen trap positioned at the midsection of the separator (1). Said auxiliary bee exit holes (10) are above the level of the pollen trap since these holes are positioned above the holes (6) associated with the pollen trap. Bees, having entered through the holes (6) associated with the pollen trap and quickly left pollen in the pollen trap, are not required to exit the hive through the holes (6), which are associated with the pollen trap, by turning back from the pollen trap. Auxiliary bee exit holes (10), which are located in a more practical position, can be used for exit, thereby relieving the colony traffic.

Figure 11:
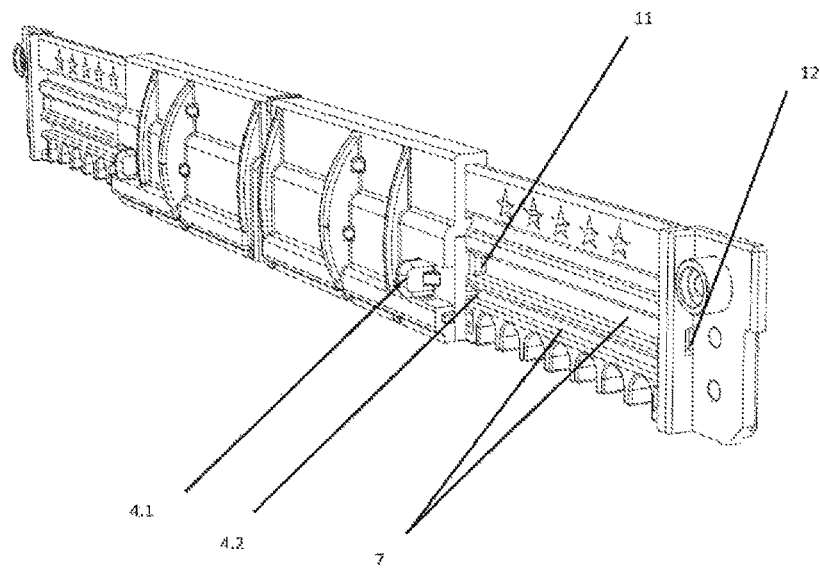

FIG. 11 illustrates the locking protrusion (11) and the locking hole (12). The locking protrusion (11) is created on the primary cover (3) and the secondary cover (4) and aims to lock at least one of the covers (3, 4) on the separator (1) by being connected to the locking hole (12).

According to the preferred embodiment of the present invention illustrated in FIG. 11, the locking protrusion (11) is created on the secondary cover (4). Said locking protrusion (11) intends to ensure locking by getting seated into the locking hole (12) created in the side portion of the separator (1).

The locking protrusion (11), having been created in the form of a protrusion, is seated into the locking hole (12), which is designed in the form of a hole, thereby fixing the secondary cover (4) onto the separator (1). This locking action enables readily closing the covers (3, 4) during the relocation of the hive, thereby preventing the entrance to and exit from the hive.

FIG. 11 illustrates the movement of the secondary cover (4) on the movement path (7) in more detail. The secondary cover (4) is provided with at least one guide (4.2) in order to enable the execution of said movement. The guide (4.2) is positioned inside the movement path (7) and guides the movement of the secondary cover (4).

Figure 12:
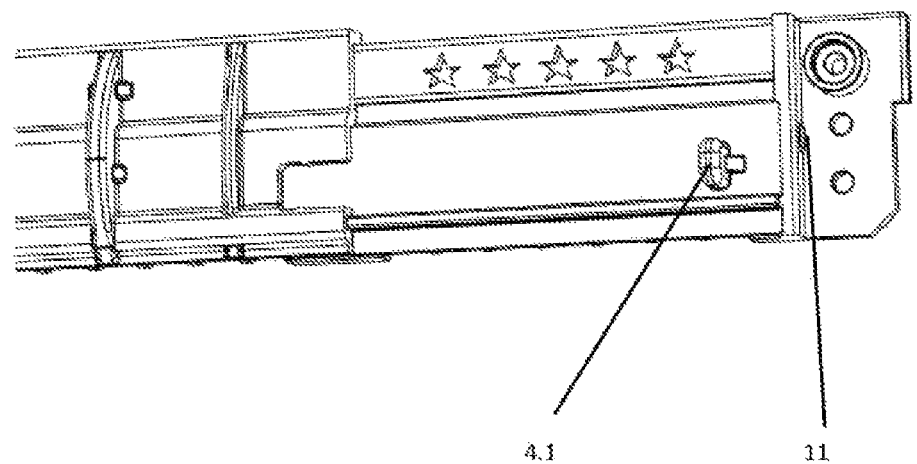

FIG. 12 illustrates the state in which the locking protrusion (11) is seated into the locking hole (12), namely, the state in which the secondary cover (4) is locked to the separator (1).

Figure 13:
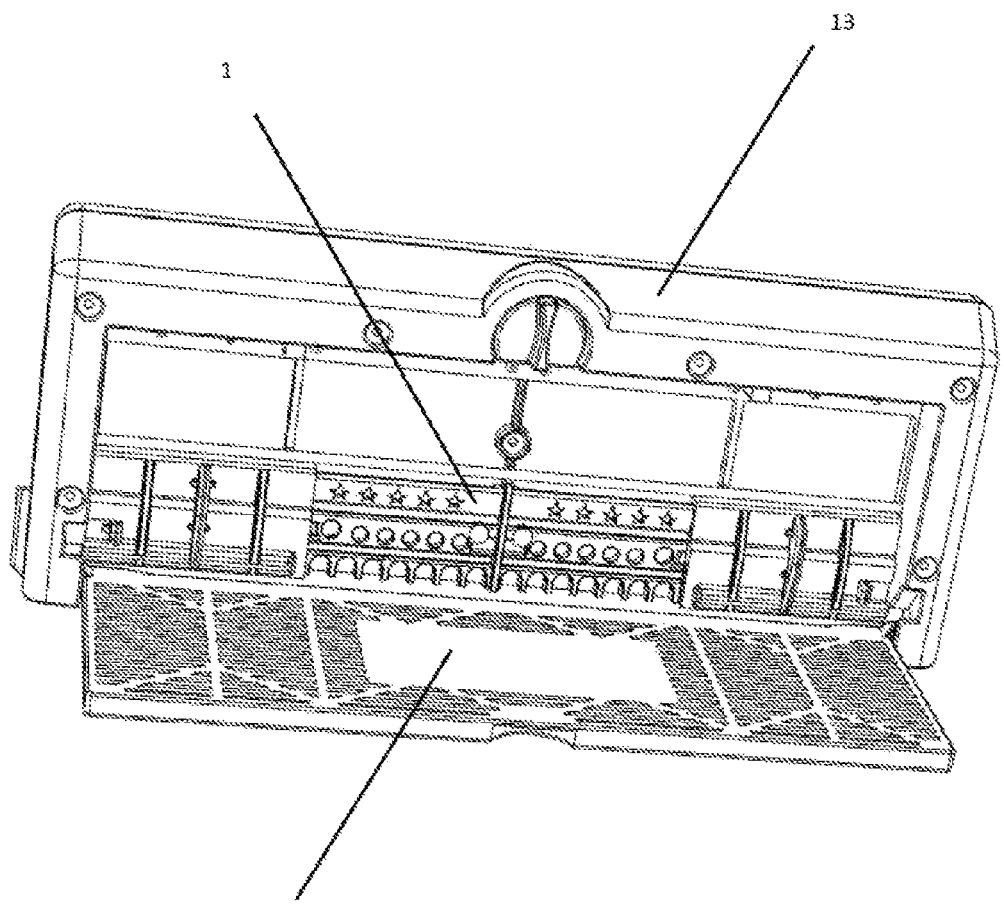

FIG. 13 illustrates the form of the separator (1) created inside the framework (13). In the embodiment of the present invention that comprises a framework (13), said framework (13) is provided with an alighting-board (14). The alighting-board (14), in addition to serving as a platform for the flight of bees, functions as a cover for the separator (1) in case the alighting-board is positioned on the separator (1).

The user may position the alighting-board (14) on top of the separator (1) and shut the hive completely to bees' entrance to and exit from the hive. Shutting the hive in such a manner will provide advantages for beekeepers who practice itinerant beekeeping. The user, in addition to readily opening and closing the separator (1), can easily manage the entrance to and exit from the hive.

FIG. 5 illustrates the version of the separator (1) according to the present invention in which the separator is further provided with drone holes (15).

What is claimed is:

1. A separator that regulates bees' entrance to and exit from a hive according to various usage and seasonal requirements, that is provided with several bee entrance-exit holes, which allow a bee colony to enter to and exit from the hive and that is provided with at least one primary cover that is configured to shift in position in order to close at least a portion of said holes, further comprising;
    at least one secondary cover which, when opened over or under the primary cover, can partially or completely close the holes that cannot be closed by means of the primary cover on the separator,
    that is associated with the primary cover in a structure that can be closed and opened over or under the primary cover,
    further comprising two primary covers that can be operated reciprocally thereon and two secondary covers that can be stowed and deployed therein.

2. A separator according to claim 1, further comprising a locking protrusion and locking hole.

3. A separator according to claim 2, wherein,
    the locking protrusion is created on one of each of the primary cover and the secondary cover, and
    the locking hole is created on the separator.

4. A separator according to claim 3, wherein the locking hole is created on the side portion of the separator.

5. A separator according to claim 1, further comprising a primary handle that is associated with at least one of the primary covers.

6. A separator according to claim 5, wherein the primary handle that is in the form of a protrusion created on one of the primary covers.

7. A separator according to claim 5, wherein one of said primary covers is provided with a handle movement gap, which is a gap in a structure in which a secondary handle can operate.

8. A separator according to claim 5, wherein one of the primary covers is provided with a handle movement opening, which is designed as an aperture in a structure in which a secondary handle can operate.

9. A separator according to claim 1, further comprising auxiliary bee exit holes in addition to bee entrance-exit holes.

10. A separator according to claim 9, wherein the auxiliary bee exit holes that are located above the holes associated with a pollen trap positioned at the midsection of the separator.

11. A separator according to claim 1, wherein the separator is formed inside a framework.

12. A separator according to claim 11, further comprising an aligning board that can be opened and closed on top of the separator in connection with framework.

13. A separator according to claim 1, further comprising fixing elements in order to fix either of the secondary covers and/or the primary covers at desired positions on the separator.

14. A separator according to claim 13, wherein there are a total of 4 fixing elements, one for each side the separator, and one adjacent to the separation element.

15. A separator according to claim 13, wherein the fixing elements are created in the form of circular protrusions in a structure such that they can be seated into and removed from one or more tolerance gaps created on the covers.

16. A separator according to claim 1, wherein a pair including at least one of each of the secondary covers and primary covers can be operated on each other and on the separator in a sliding manner.

17. A separator according to claim 1, wherein said two primary covers that can move on the plane of the separator over the movement paths, each being created separately on the separator, that are located on the separator, which are separated from each another by means of at least one separation element.

18. A separator according to claim 1, wherein at least one of the secondary covers that can move into and out of the primary covers by means of a spring action.

19. A separator according to claim 1, further comprising a secondary handle associated with at least one of the secondary covers.

20. A separator according to claim 1, further comprising a base mounting element created on at least one side portion thereof.

21. A separator according to claim 1, further comprising hive mounting elements, in which the mounting members used for fixing the separator to the wall of the hive can operate.

* * * * *